(12) United States Patent
Sosnowski

(10) Patent No.: US 6,550,783 B2
(45) Date of Patent: Apr. 22, 2003

(54) SEALED END GASKET

(75) Inventor: Anthony M. Sosnowski, Stroudsburg, PA (US)

(73) Assignee: Laird Technologies Inc., Delaware Water Gap, PA (US)

( * ) Notice: Subject to any disclaimer, the term of this patent is extended or adjusted under 35 U.S.C. 154(b) by 0 days.

(21) Appl. No.: 09/800,683

(22) Filed: Mar. 7, 2001

(65) Prior Publication Data

US 2002/0005617 A1 Jan. 17, 2002

Related U.S. Application Data

(60) Provisional application No. 60/188,409, filed on Mar. 10, 2000.

(51) Int. Cl.[7] ............................................. F16J 15/08
(52) U.S. Cl. ..................... 277/650; 277/628; 277/652; 277/906; 277/920
(58) Field of Search .................. 277/628, 650, 277/652, 906, 920; 174/35 GC; 29/825, 419.1, 826

(56) References Cited

U.S. PATENT DOCUMENTS

| | | | | |
|---|---|---|---|---|
| 5,581,048 A | * | 12/1996 | Shores | 174/17 CT |
| 5,603,514 A | * | 2/1997 | Jencks et al. | 174/35 GC |
| 5,889,229 A | * | 3/1999 | Sosnowski | 174/35 GC |
| 5,902,956 A | * | 5/1999 | Spies et al. | 174/35 GC |
| 6,219,906 B1 | * | 4/2001 | Sosnowski | 174/35 GC |

* cited by examiner

*Primary Examiner*—Anthony Knight
*Assistant Examiner*—E Peavey
(74) *Attorney, Agent, or Firm*—Pitney, Hardin, Kipp & Szuch LLP

(57) ABSTRACT

The disclosure describes a method of sealing the ends of fabric on a radio frequency interference (RFI) gasket and a description of the gasket made by such method. The method used electrically conductive material to cover a foam interior and then sealing the exposed ends of all six sides of the covering, creating a radio frequency interference (RFI) gasket.

19 Claims, 2 Drawing Sheets

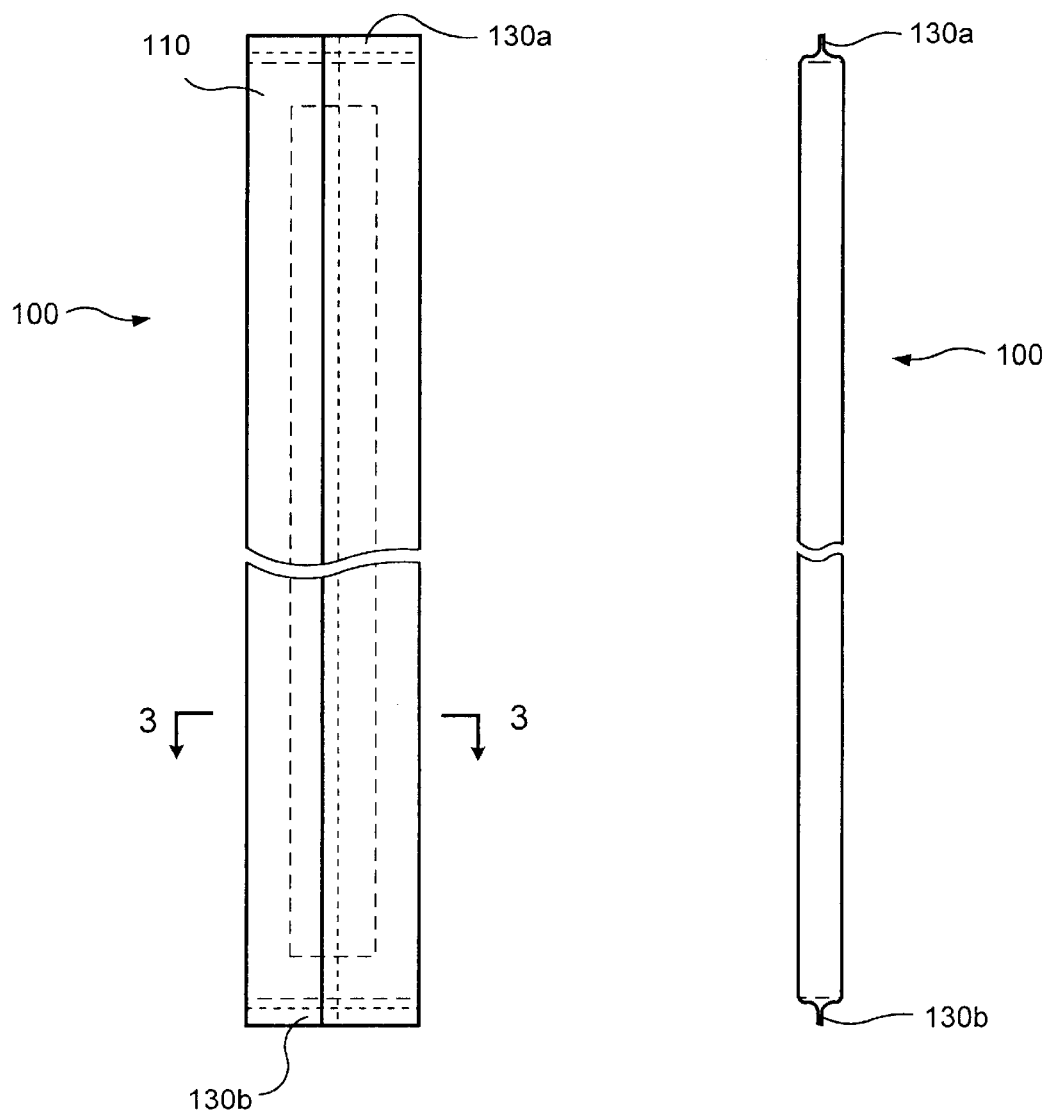
FIG. 1
FIG. 2
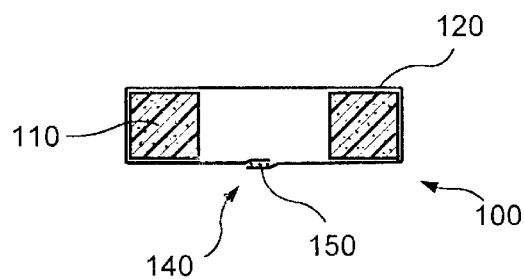
FIG. 3

SEALED END GASKET

BACKGROUND OF THE INVENTION

This application claims priority from Provisional Application No. 60/188,409 titled "Sealed End Gasket" filed on Mar. 10, 2000, the disclosure of which incorporated herein by reference.

FIELD OF THE INVENTION

The invention relates generally to gaskets and more particularly to a method to seal the ends of the fabric in a radio frequency interference (RFI) gasket and the gasket made by such method.

DESCRIPTION OF THE PRIOR ART

Conventional RFI shielding gaskets are formed with an electrically conductive fabric outer covering over a foam interior. Conventional die-cut fabric over foam gaskets typically have an open end in the fabric which can permit RF leakage. One way to reduce leakage is by sealing the ends of all six sides. This can be done by creating complex fabric shapes and folding and sealing the complex shape over the foam. This results in high labor costs and reduces output over time. It also results in the waste of the electrically conductive fabric.

Accordingly, it is desirable to provide an improved shielding gaskets with sealed ends which overcomes drawbacks of the prior art.

SUMMARY OF THE INVENTION

Generally speaking, in accordance with the invention, a fabric over foam gasket and method of construction are provided. The fabric can be disposed around a foam body and the ends can be heat sealed or sealed with an adhesive to provide high shielding properties. To form gaskets in accordance with the invention, a length of electrically conductive fabric is extended, a foam body is disposed on the fabric with edge portions of the fabric extending sideways beyond the edge of the foam body. The edge portions are then folded over the foam body and joined, such as by heat sealing. The fabric is then cross-cut and the cross-cut ends are sealed, such as by adhesive or heat sealing to provide a foam gasket completely covered with conductive fabric. The cutting and sealing can be accomplished in a single step with a hot knife. The fabric covered foam can then be die cut to the shape of the foam gasket and the outer edges will remain completely covered with the fabric.

A gasket in accordance with preferred embodiments of the invention preferably comprises an inner supporting structure having a top, a bottom, a pair of sidewalls in the length direction extending from the top to the bottom and a pair of sidewalls in the width direction extending from the top to the bottom and fabric, preferably having conductive properties, covering the top, the bottom, the pair of sides in the width direction and the pair of sides in the length direction. The fabric preferably extends continuously from the top, to the sides in the length direction to the bottom and is sealed at the sides in the width direction and the gasket preferably has electric wave shielding properties.

A preferred method of forming a gasket in accordance with preferred embodiments of the invention preferably comprises providing a length of fabric preferably having electrically conductive properties having a top surface and a bottom surface and first and second edge regions extending in the length direction and adhesive on a portion of the top surface along at least a first edge region and repeated adhesive stripes extending at least partially from edge to edge on the top surface, perpendicular to the length direction, disposing gasket bodies between the repeated adhesive stripes extending in the edge to edge direction between the first and second edge regions; folding the second edge region of the fabric over the top of the gasket body and folding the first edge, which has adhesive on the top surface thereof over the gasket body, such that the adhesive on the top surface of said other side is in contact with what had been the bottom surface of the second edge region, cutting the fabric cross-wise at the adhesive stripes, the cut location intermediate the adhesive stripe; and sealing the adhesive in the cross-wise direction, to provide a fabric covered gasket in which the fabric covers the top, bottom sides in the width direction and sides in the length direction of the gasket body. The fabric covered body can then be die cut and the edges will have fabric covering to provide effective shielding capabilities.

Accordingly, it is an object of the invention to provide an improved RF shielding gasket.

Another object of the invention is to provide electrically shielding gaskets in a more convenient and simple manner.

The invention accordingly comprises the several steps and the relation of one or more of such steps with respect to each of the others, and in the article possessing the features, properties and the relation of elements, which are exemplified in the following detailed disclosure, and the scope of the invention will be indicated in the claims.

BRIEF DESCRIPTION OF THE DRAWINGS

For a fuller understanding of the invention, references had to the following description, taken in connection with the accompanying drawings, in which:

FIG. 1 is a top plan view of a die cut fabric over foam gasket in accordance with an embodiment of the invention;

FIG. 2 is a side view of a die cut fabric over foam gasket in accordance with an embodiment of the invention;

FIG. 3 is an end cross sectional view along line 3—3 of FIG. 1, of a die cut fabric over foam gasket in accordance with an embodiment of the invention.

DETAILED DESCRIPTION OF THE PREFERRED EMBODIMENTS

Figure 4:
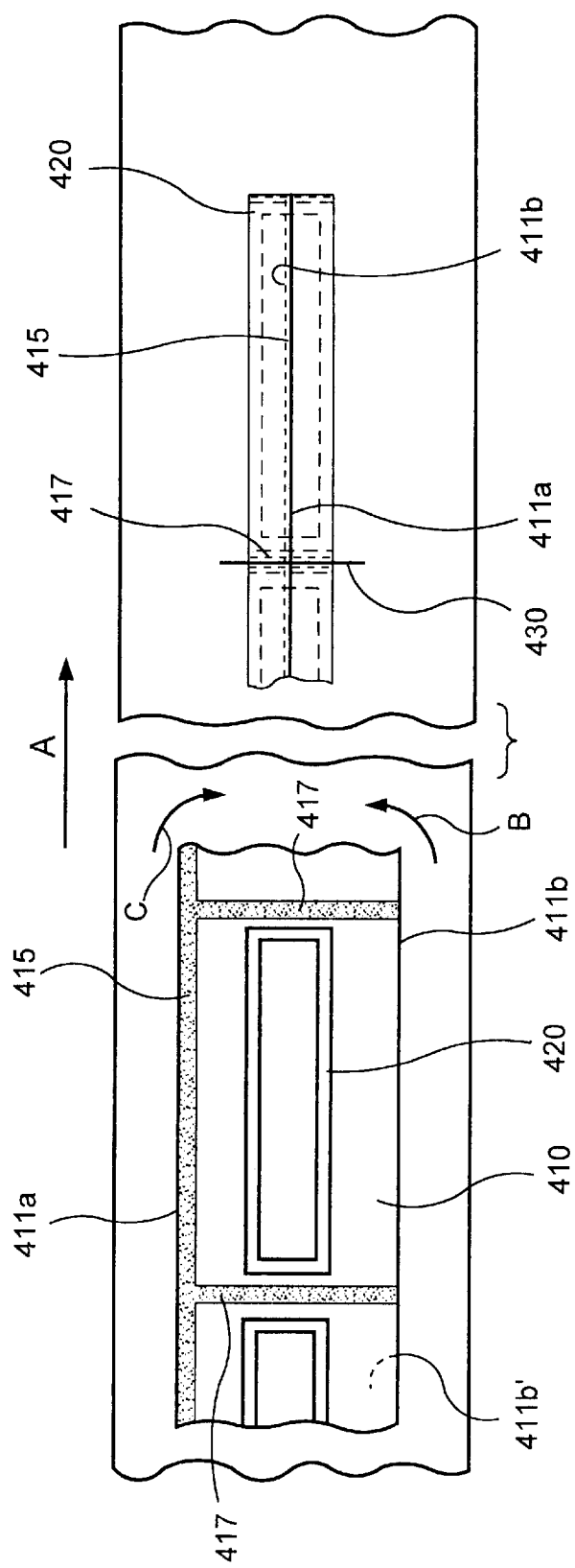
FIG. 4 is a top plan view illustrating the manufacture of gaskets in accordance with an embodiment of the invention.

A die cut fabric over foam gasket in accordance with a preferred embodiment of the invention is shown generally as gasket 100 in FIGS. 1–3. Gasket 100 is formed with a foam inner portion 110 and an electrically conductive fabric 120 disposed around inner foam portion 110. Gasket 100 also includes ends 130a and 130b where the fabric has been sealed, as shown most clearly in FIG. 2. Gasket 100 also includes an overlap section 140, best seen in FIG. 3, where edges of fabric portion 120 overlap and are joined by an adhesive 150.

In a preferred embodiment of the invention, the overall width of gasket 100 is 1.20 inches, the overall length is 12.125 inches, and the thickness is 0.312 inches. A rectangular portion 0.606 inches in width is cut out from foam portion 110, to leave a picture frame shape with 0.312 inch sides. Ends 130a and 130b are 0.125 inches wide. Shielding up to and in excess of 120 dB @ 1 GHz can be achieved. The gasket is well suited for use at the I/O panel of an electrical device such as a computer.

Foam portion 110 is preferably formed from any number of urethane or neoprene foams which are well known in the industry. Fabric 120 can be formed from various known types of electrically conductive fabric. For example, fabric in which the individual threads are plated with conductive material, such as silver, where the entire outer surface of the fabric is plated with conductive material, such as a copper/nickel alloy or where some other arrangement is provided so that the fabric has radio frequency interference shielding properties is suitable The adhesives are preferably selected from a wide variety of known adhesives, preferably heat activated adhesives, selected to be compatible with the fabric and foam.

A preferred non-limiting method of forming end sealed die cut fabric over foam gaskets in accordance with preferred embodiments of the invention is illustrated generally in FIG. 4. A length of fabric 410 having side edges 411*a* and 411*b* is withdrawn from a roll. At least one of side edges 411*a* and 411*b*, such as side edge 411*a* is preferably pre-coated with an adhesive, such as a heat-activated adhesive 415. Alternatively, adhesive 415 can be disposed after the fabric is unrolled or on the bottom of the fabric. Fabric 410 also includes repeated cross-stripes (or partial cross-stripes) of adhesive 417 which preferably extend from edge 411*a* to edge 411*b* perpendicular to the length of the fabric.

As fabric 410 travels in the direction of an arrow A, a gasket inner body 420, preferably formed from foam, is disposed thereon, between repeating adhesive stripes 417. Edge 411*b* is then folded in the direction of an arrow B so as to cover a portion of gasket inner body 420. Edge 411*a* is then folded in the direction of an arrow C so as to overlap what had been an underside 411*b'* of fabric 410 at edge 411*b*, with adhesive 415 contacting underside edge 411*b'*. Adhesive 415 is then heat activated. The folding and heat activation can be performed as part of a single step, to yield a length of folded and partially sealed fabric having a plurality of gasket inner bodies 420 enclosed therein.

After adhesive 415 has sealed edge 411*a* to edge 411*b* fabric 410 is cross-cut at a line 430 to divide the portion of the fabric having adhesive stripe 417 thereon into two portions. The cut at line 430 can be performed with a hot knife to simultaneously sever fabric 410 and activate adhesive 417. It should also be understood that adhesive 417 need not extend completely from edge 411*a* to edge 411*b'*, but only needs to be disposed so as to completely seal the exposed ends of fabric 410 after the cut is made along line 430.

It will thus be seen that the objects set forth above, among those made apparent from the preceding description, are efficiently attained and, since certain changes may be made in carrying out the above method and in the article set forth without departing from the spirit and scope of the invention, it is intended that all matter contained in the above description and shown in the accompanying drawings shall be interpreted as illustrative and not in a limiting sense It is also to be understood that the following claims are intended to cover all of the generic and specific features of the invention herein described and all statements of the scope of the invention which, as a matter of language, might be said to fall therebetween.

What is claimed is:

1. A gasket for reducing radio frequency interference in electrical devices comprising:
   an inner gasket body, wherein said inner gasket body comprises a top section, a bottom section, a pair of sidewalls in a length direction extending from the top section to the bottom section and a pair of sidewalls in a width direction from the top section to the bottom section;
   an electrically conductive fabric disposed around said inner gasket body to provide an overlap of fabric edges extending in said length direction and to provide fabric ends extending in said width direction, wherein said ends of said fabric are sealed with the opposing ends of said fabric in a sealing operation in said width direction and wherein said overlap of said fabric edges is sealed in a sealing operation in said length direction.

2. The gasket of claim 1, further including an inner area boundaried by the interior section of said sidewalls in a length direction and by the interior section of said sidewalls in a width direction.

3. The gasket of claim 1, wherein said inner gasket body comprises neoprene foam.

4. The gasket of claim 1, wherein said inner gasket body comprises urethane foam.

5. The gasket of claim 1, wherein said fabric is disposed around the inner gasket body structure such that said fabric extends continuously from the top section of said inner gasket body to the sides of the inner gasket body in the length direction to the bottom section of said inner gasket body wherein said fabric is sealed at the sides in a sealing operation in the width direction.

6. The gasket of claim 1 or 5, wherein said sealing operation of said fabric comprises the use of an adhesive.

7. The gasket of claim 6, wherein said adhesive is heat activated.

8. The gasket of claim 2 wherein said gasket has an overall width of approximately 1.20 inches; an overall length of approximately 12.125 inches, an overall thickness of approximately 0.312 inches; wherein said sidewalls in the length direction have an overall width of approximately 0.312 inches and wherein said sidewalls in the width direction have an overall width of approximately 0.125 inches.

9. The gasket of claim 1 or 8, wherein said gasket provides shielding of less than 120 dB @ 1 GHz.

10. The gasket of claim 1 or 8, wherein said gasket provides shielding of approximately 120 dB@ 1 GHz.

11. The gasket of claim 1 or 8, wherein said gasket provides shielding of greater than 120 dB @ 1 GHz.

12. A method of making a gasket for reducing radio frequency interference in electrical devices comprising the steps of:
    providing a length of fabric with electrically conductive properties having a top surface, a bottom surface and first and second regions extending in the length direction and adhesive on a portion of the top surface along at least a first edge region and repeated adhesive strips extending at least partially from edge to edge on the top surface, perpendicular to the length direction;
    disposing an inner gasket body between the repeated adhesive strips extending in an edge to edge direction between the first and second edge regions;
    folding the second edge region of the fabric over the top of the inner gasket body and folding the first edge, which has adhesive on the top surface thereof over the inner gasket body, such that the adhesive on the top surface of said other side is in contact with what had been the bottom surface of the second edge region;
    cutting the fabric cross-wise at the adhesive strips, the cut location immediate to the adhesive strip; and
    sealing the adhesive in the cross-wise direction, thereby providing a fabric covered gasket in which the fabric covers the top and bottom sides in the width direction and the sides in the length direction of the inner gasket body.

13. The method of claim 12, furthering including the step of heat-activating the adhesive on the top surface of said fabric when in contact with what had been the bottom surface of the second edge region.

14. The method of claim 12, further including the step of using a hot knife when cutting the fabric at the adhesive strips thereby simultaneously sealing the adhesive during the cutting operation.

15. The method of claim 12, wherein said adhesive is on a portion of the bottom surface along said first edge region.

16. The method of claim 12 comprising the step of applying adhesive to the length of said fabric on a portion of the top surface along at least a first edge region.

17. The method of claim 12, comprising the step of applying adhesive to the length of said fabric on a portion of the bottom surface along at least a first edge region.

18. The method of claim 12, further including the step of die-cutting said gasket thereby creating a gasket shape for use in different sections of said electrical device.

19. The method of claim 12 or 18 wherein said fabric is disposed on a plurality of inner gasket bodies.

\* \* \* \* \*